United States Patent Office 3,574,090
Patented Apr. 6, 1971

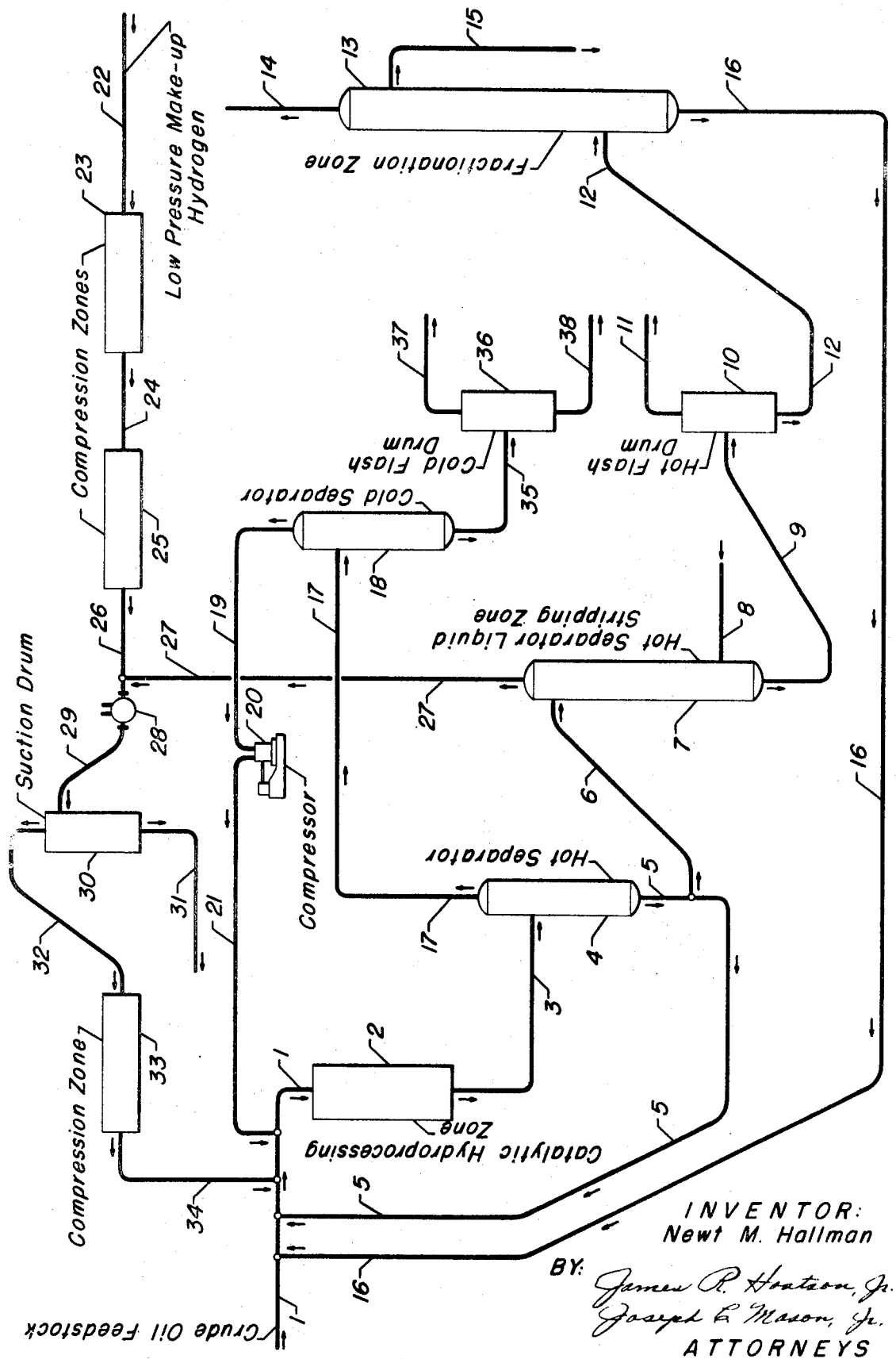

3,574,090
RECOVERY AND REUSE OF HYDROGEN FROM A CATALYTIC HYDROPROCESSING PROCESS
Newt M. Hallman, Mount Prospect, Ill., assignor to Universal Oil Products Company, Des Plaines, Ill.
Filed Jan. 31, 1969, Ser. No. 795,599
Int. Cl. C10g *13/00*
U.S. Cl. 208—108                                9 Claims

ABSTRACT OF THE DISCLOSURE

Hydrogen is recovered from a normally liquid hydrocarbon fraction produced by the catalytic hydroprocessing of a petroleum crude oil feedstock and reused in the catalytic hydroprocessing unit by utilizing a hot separator liquid stripping zone, high pressure superheated steam as the stripping medium and an admixing step wherein the recovered stripped hydrogen is admixed at an intermediate pressure in a compression zone with an added low pressure makeup hydrogen stream.

BACKGROUND OF THE INVENTION

This invention relates to a method for the recovery and reuse of hydrogen from a normally liquid hydrocarbon fraction produced by the catalytic hydroprocessing of a petroleum crude oil feedstock. This invention specifically relates to a method for the recovery and reuse of hydrogen from a normally liquid hydrocarbon fraction produced by the catalytic hydroprocessing of a petroleum crude oil feedstock utilizing a hot separator stripping zone, high pressure superheated steam as the stripping medium, and an admixing step wherein recovered stripped hydrogen is admixed at an intermediate pressure in a compression zone with an added makeup hydrogen stream emanating from a low pressure zone.

In high pressure processes that consume or produce hydrogen, some hydrogen is normally found in the liquid products by having been either equilibrium present or entrained in the liquid products. My invention is a method of recovering and reusing this hydrogen so contained by less expensive capital and operating means than would be conventionally employed by utilizing relatively low pressure and/or temperature in my hot separator liquid stripping zone which would tend to increase the efficiency of my process.

By the term "catalytic hydroprocessing" I mean to include any processing of a petroleum fraction under elevated hydrogen pressure involving a consumption of hydrogen by the petroleum fraction. This naturally includes hydrocracking, hydrotreating, and hydrorefining or hydropurification.

In typical prior art processes, hydrogen is lost from the process in the liquid from the hot separator and the cold separator that usually follows the catalytic hydroprocessing zone. This hydrogen gas usually ends up in the hot flash gas condensate drum and the cold flash condensate drum. These gases can be recovered and reused by compression or else burned as fuel or they could be used, after clean-up, as charge to a hydrogen manufacturing unit. However, I have found that in my method, hydrogen in the hot separator liquid is preferentially stripped at relatively low presure and/or temperature with superheated steam as the stripping medium in a vessel called the hot sparator liquid stripping zone.

SUMMARY OF THE INVENTION

It is an object of this invention to provide a method for the recovery and reuse of hydrogen from a normally liquid hydrocarbon fraction produced by the catalytic hydroprocessing of a petroleum crude oil feedstock.

Therefore, the present invention provides a method for the recovery and reuse of hydrogen from a normally liquid hydrocarbon fraction produced by the catalytic hydroprocessing of a petroleum crude oil feedstock which comprises the steps of: (a) introducing said feedstock into a catalytic hydroprocessing zone maintained under catalytic hydroprocessing conditions including the presence of hydrogen sufficient to produce an effluent stream containing unreacted hydrogen gas, a normally gaseous component fraction, a normally gaseous hydrocarbon fraction, and normally liquid hydrocarbons; (b) passing said effluent stream into a separation zone wherein said stream is separated into a hydrogen-rich gaseous hydrocarbon fraction, normally gaseous components, a normally gaseous hydrocarbon fraction and a normally liquid hydrocarbon fraction; (c) passing said gaseous fractions of Step (b) into a second separation zone wherein said fractions are separated into hydrogen, hydrocarbons, and gaseous components; (d) passing a portion of said normally liquid hydrocarbon fraction into a stripping zone maintained under stripping conditions wherein said fraction is contacted with high pressure superheated steam to preferentially strip hydrogen from said fraction; (e) passing said hydrogen of Step (d) to admix at an intermediate pressure with an added low pressure makeup hydrogen stream; (f) compressing in a compression zone the resultant combined hydrogen stream formed in Step (e) to substantially the same operating pressure imposed upon said catalytic hydroprocessing zone; (g) passing said compressed combined hydrogen stream of Step (f) and said hydrogen of Step (c) to admixture with the remaining portion of said normally liquid hydrocarbon of Step (b) prior to returning into said catalytic hydroprocessing zone of Step (a); (h) passing a substantially hydrogen-free normally liquid hydrocarbon fraction from said stripping zone of Step (d) into a fractionation zone; and, (i) recovering the normally liquid hydrocarbons of Step (a).

As will be described hereinafter in greater detail, the essence of my invention encompasses the preferential stripping of hydrogen at relatively low pressures and/or temperatures from a normally liquid hydrocarbon fraction produced by the catalytic hydroprocessing of a petroleum crude oil feedstock wherein the recovered stripped hydrocarbon is admixed at an intermediate pressure in a compression zone with an added makeup hydrogen stream emanating from a low pressure zone.

The term "petroleum crude oil feedstock" is meant to include any oils extracted from tar sands, topped or reduced crudes, vacuum residium (vacuum tower bottom products) and those petroleum crude oils referred to as "black oils" which contain a significant quantity of asphaltic materials and high concentrations of sulfur, as well as large quantities of nitrogenous compounds and high molecular weight organic metallic complexes principally comprising nickel and vanadium. These "black oils" include those hydrocarbon charge stocks of which at least about 10% by volume boils above a temperature of about 1050° F. These black oils usually have an API gravity, at 60° F., or less than 20.0 and further, sulfur concentrations are usually more than 1% by weight and often in excess of 3% by weight.

As set forth hereinabove, this invention relates to a method for the recovery and reuse of hydrogen from a normally liquid hydrocarbon fraction produced by the catalytic hydroprocessing of a petroleum crude oil feedstock. Many catalysts are suitable for the catalytic hydroprocessing of a petroleum crude oil feedstock. A particularly preferred catalytic hydroprocessing catalyst which may be utilized in the method of the present invention can be characterized as comprising a metallic component possessing a hydrogenation activity which component is composited with a refractory inorganic oxide carrier material which may be of synthetic or metallic origin. The precise composition and method of manufacturing the catalytic composition is not considered to be an essential element of the present method.

However, a particularly suitable catalyst for use of my invention would comprise a refractory inorganic oxide carrier material such as alumina, silica, zirconia, magnesia, titania, boria, strontia, hafnia, etc., and mixtures thereof including silica-alumina, silica-zirconia, silica-magnesia, silica-titania, alumina-zirconia, silica-alumina-boron phosphate, alumina-magnesia, alumina-titania, magnesia-zirconia, titania-zirconia, magnesia-titania, silica-alumina-zirconia, silica-alumina - magnesia, silica-alumina-titania, silica-magnesia-zirconia, silica-alumina-boria, etc. It is preferred to utilize a carrier material containing at least a portion of silica, and it is particularly preferred to utilize a composite of alumina and silica. Suitable metallic components for hydrogenation activity are those selected from the group consisting of the metals of Groups VI–B and VIII of the Periodic Table. Thus, the catalytic composition may comprise one or more metallic components selected from the group consisting of molybdenum, tungsten, chromium, iron, cobalt, nickel, platinum, palladium, iridium, osmium, rhodium, ruthenium, and mixtures thereof. The concentration of the catalytically active metallic component or components is primarily dependent upon the particular metal utilized as well as the characteristics of the charge stock. The Group VI–B metal, such as chromium, molybdenum, or tungsten is usually preferred in an amount of from about 0.5% to about 10% by weight of the catalyst. Group VIII metals, which may be divided into two subgroups, namely the iron subgroup and the noble metal subgroup, are preferred in an amount of from about 0.1% to 10.0% by weight of the total catalyst. When an iron subgroup metal such as iron, cobalt, or nickel, etc. is employed, it is preferred in an amount from about 0.2% to about 10.0% by weight. When a noble metal subgroup metal such as platinum, palladium, or iridium, etc. is employed, it is preferred to utilize an amount within the range of from about 0.1% to about 5.0% by weight of the total catalyst.

When utilizing a catalytic hydroprocessing catalyst such as described above, the catalytic hydroprocessing zone containing the catalyst is usually maintained under catalytic hydroprocessing conditions including a temperature of from about 600° F. to about 1000° F. as measured at the inlet to the fixed bed of catalyst disposed within the reaction zone and preferably at a temperature of about greater than 700° F. The catalytic hydroprocessing zone is maintained at a selected operating pressure which is usually maintained at about 100 p.s.i.g. and preferably in the range of from about 1000 to 4000 p.s.i.g. Hydrogen is passed to the catalytic hydroprocessing zone in an amount of from about 2000 to 40,000 s.c.f./bbl. and preferably of from about 2000 to 20,000 s.c.f./bbl. at the selected operating pressure. The liquid hourly space velocity (being defined as the volume of liquid hydrocarbon charge per hour per volume of catalyst disclosed within the reaction zone) is maintained in the range of from about 0.25 to about 4.0.

The first separation zone is usually referred to as a hot separator and is usually maintained at substantially the same pressure imposed upon the catalytic hydroprocessing zone. The first separation zone is maintained usually at a temperature of from about 650° F. to about 800° F.

The hot separator liquid stripping zone is usually maintained at substantially lower pressure, for example, from about 500 p.s.i. to about 1500 p.s.i. lower than that imposed upon the catalytic hydroprocessing zone but above the pressure level of the zone from which the low pressure hydrogen emanates. This stripping zone is maintained under stripping conditions at a temperature consistent with the equilibrium flash conditions existing due to an adiabatic flash at the predetermined pressure level so that high pressure superheated steam may preferentially strip hydrogen from a liquid hydrocarbon fraction charged to the stripping zone. The stripping zone may contain trays, baffles and the like, and usually the liquid hydrocarbon fraction is passed countercurrently to the high pressure superheated steam stripping medium.

The second separation zone is usually referred to as a cold separator and is maintained at a temperature below about 150° F. and is maintained at substantially the same operating pressure as the catalytic hydroprocessing zone.

The flash zones utilized in my method are usually referred to as a cold flash system and a hot flash system. The cold flash system follows the cold separator and is maintained at substantially reduced pressure usually in the range from about subatmospheric to 1000 p.s.i.g. and preferably from about atmospheric pressure to 300 p.s.i.g. The hot flash system is maintained at essentially the same pressure as the cold flash liquid stripping zone described above. As the names of these systems indicated, the hot flash system is maintained at higher temperatures than the cold flash system. The hydrogen recovered from the hot separator after passing to the cold separator is passed to a recycle compressor and then to admixture with the normally liquid hydrocarbon returning to the catalytic hydroprocessing zone.

The recovered stripped hydrogen from the hot separator liquid stripping zone is passed to a compression zone which may be a series of compression zones successively stepping up the pressure of the material passing to the compression zone prior to recycle to the catalytic hydroprocessing zone. In this manner, low pressure make-up hydrogen, for example, which may be obtained at a pressure of from about atmospheric pressure to about 450 p.s.i.g. may be successively stepped up in a series of compression zones so that at the discharge end of the last compression zone, substantially the same operating pressure of the catalytic hydroprocessing unit is achieved. As will be described hereinafter in a preferred embodiment, I prefer to utilize a series of three compression zones wherein the recovered stripped hydrogen from my process is admixed with twice-compressed makeup hydrogen at the discharge side of the second compression zone so that the recovered hydrogen as well as makeup hydrogen can be compressed in a third compression zone to the operating pressure of the catalytic hydroprocessing unit. For example, I prefer my makeup hydrogen stream to be obtained at a pressure of from about atmospheric to about 200 p.s.i.g. and the first compression zone maintained so that the stream is compressed to about 500 p.s.i.g. My second compression zone is maintained so that discharge pressure from this zone is obtained at about 1300 p.s.i.g. My third compression zone is maintained so that discharge pressure from this zone is obtained at a pressure of at least 3000 p.s.i.g.

The fractionation zone utilized in my method may be of a conventional type and is utilized for obtaining a normally liquid hydrocarbon produced from a catalytic hydroprocessing reaction. The fractionation zone may be a series of fractional distillation columns including vacuum distillation columns and the fractionation zone may provide recycle back to the catalytic hydroprocessing zone with any one of a number of recycle streams or may be utilized strictly for the recovery of all the liquid products.

My invention can be most clearly described and illustrated with reference to the attached drawing which is a schematic representation of one specific embodiment of the invention.

DESCRIPTION OF THE DRAWING

Referring now to the drawing, a petroleum crude oil feedstock is passed via line 1 to catalytic hydroprocessing zone 2 wherein a catalytic hydroprocessing catalyst, as described above, is disposed therein. The reaction zone may be equipped with heat transfer means, baffles, trays, heating means, etc. The reaction zone is preferably of the adiabatic type and thus feed to the reaction zone will preferably be provided with the requisite amount of heat prior to passage thereof to said reaction zone. The actual operation of the reaction zone may be upflow, downflow, or radial flow. At the end of the desired residence time in the reactor, an effluent stream is removed from the catalytic hydroprocessing zone 2 via line 3 for passage to hot separator 4. The effluent stream contains unreacted hydrogen gas, normally gaseous components, normally gaseous hydrocarbons, and normally liquid hydrocarbons.

In hot separator 4, the effluent is separated into an unreacted hydrogen gas fraction, normally gaseous components including sulfur containing compounds and ammonia containing compounds. A portion of the normally liquid hydrocarbon fraction is withdrawn from separator 4 via line 5 for recycle to catalytic hydroprocessing zone 2 while the remaining portion of this fraction passes via line 6 through conventional pressure reducing means (not shown) contained therein into hot separator liquid stripping zone 7 at a lower pressure than separator 4 wherein the fraction is contacted with high pressure superheated steam via line 8 to preferentially strip hydrogen from the fraction. The hydrogen recovered in hot separator liquid stripping zone 7 is then passed via line 27 to admix in line 26 with makeup hydrogen emanating from a low pressure source. The gaseous fractions separated in separator 4 pass to the second separation zone shown as cold separator 18 wherein said fractions are separated into hydrogen, hydrocarbon, and gaseous component.

In cold separator 18, the hydrogen fraction is separated from the normally gaseous components and the normally gaseous hydrocarbon fraction. In the drawing, the hydrogen fraction is shown to be removed from separator 18 via line 19 which passes to recycle compressor 20 and then, at substantially the catalytic hydroprocessing zone pressure, via line 21, to line 1 for admixture with the compressed combined hydrogen stream from line 34 and the normally liquid hydrocarbon from line 5 prior to returning to the catalytic hydroprocessing zone 2.

The makeup hydrogen via line 22, emanating from a low pressure source is passed to a first compression zone 23 and then passed via line 24 to a second compression zone 25 maintained at an intermediate pressure. The makeup hydrogen removed from compression zone 25 passes via line 26 to cooler 28 and then via line 29 to suction drum 30. The hydrogen recovered in hot separator liquid stripping zone 7 passes via line 27 to admix at an intermediate pressure with the twice-compressed hydrogen from second compression zone 25 in line 26 prior to passing to cooler 28. Steam condensate and some entrained hydrocarbon is removed from suction drum 30 via line 31, and the resultant combined hydrogen stream formed at intermediate pressure is then passed to a third compression zone 33 wherein the resultant combined hydrogen stream is compressed to substantially the same operating pressure imposed upon the catalytic hydroprocessing zone. This stream is then passed via line 34 and the hydrogen from line 22 is admixed with the remaining portion of the normally liquid hydrocarbon obtained from hot separator 4 in line 1 prior to passing to catalytic hydroprocessing zone 2.

The normally gaseous components and the normally gaseous hydrocarbon fraction separated in separator 18 are passed via line 35 to cold flash drum 36 wherein the normally gaseous components are separated from the normally gaseous hydrocarbon. Lines 37 and 38 represent the separated streams. These components recovered via lines 37 and 38 may be discarded or passed to other vessels, including fractionation vessels, not shown, for further use in my process. A recycle liquid from cold flash drum 36 to cold separator 18 may be present to increase the percent hydrogen in line 19.

From hot separator liquid stripping zone 7, a stripped normally liquid hydrocarbon fraction is removed and passed via line 9 to hot flash drum 10 which is maintained at a lower pressure then hot separator liquid stripping zone 7 so that any gaseous components still entrained in the normally liquid hydrocarbon fraction may be removed. These gaseous components are removed from the process via line 11. The hydrogen-free normally liquid hydrocarbon fraction is then passed from hot flash drum 10 via line 12 to fractionation zone 13 which may be a series of conventional fractional distillation columns including vacuum distillation columns. In fractionation zone 13, desired products are removed from the process via lines 14 and 15 and are subsequently recovered. A heavy bottoms fraction may be removed from fractionation zone 13 and passed via line 16 to admix with the petroleum crude oil feedstock in line 1 for recycle to the catalytic hydroprocessing zone. In this manner, the high purity hydrogen normally found in the liquid products from a catalytic hydroprocessing reaction is recovered and is reused by the utilization of my method. In addition, the hydrogen is recovered at substantially lower operating pressures than that maintained in the catalytic hydroprocessing zone so that the stripping efficiency of the superheated steam in hot separator liquid stripping zone 7 is increased.

It is to be understood throughout the entire discussion of my invention that the references to substantially the same operating pressure of the catalytic hydroprocessing zone refers and is intended to connote that pressure drop only as a result of the flow of fluids through the typical catalytic hydroprocessing unit is the reason for slightly lower pressures being present in subsequent vessels in the flow scheme. No specific intentional means has been employed to reduce this pressure except where specifically indicated in the above discussion.

PREFERRED EMBODIMENT

In a particularly preferred embodiment of this invention, this invention provides a method for the recovery and reuse of hydrogen from a normally liquid hydrocarbon fraction produced by the catalytic hydroprocessing of a petroleum crude oil feedstock which comprises the steps of: (a) introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons; (b) passing said effluent stream into a separation zone wherein said stream is separated into a hydrogen-rich gaseous hydrocarbon fraction, a normally gaseous component fraction, a normally gaseous hydrocarbon fraction, and a normally liquid hydrocarbon fraction; (c) passing said gaseous fractions of Step (b) into a second separation zone wherein said fractions are separated into hydrogen, hydrocarbon, and gaseous component; (d) passing a portion of said normally liquid hydrocarbon fraction into a stripping zone maintained under stripping condition wherein said fraction is contacted with high pressure superheated steam to preferentially strip hydrogen from said fraction; (e) passing a low pressure makeup hydrogen stream into a first compression zone wherein said stream is compressed and then passed to a second compression zone wherein said stream is further compressed to an intermediate pressure; (f) passing said hydrogen of Step (d) to admix at said intermediate pressure with said hydrogen stream of Step (e); (g) compressing in a third compression zone the resultant combined hydrogen stream formed in Step (f) to substantially the same operating pressure imposed upon said catalytic hydroprocessing zone; (h) passing said combined hydrogen stream of Step (g) and said hydrogen of Step (c) to admixture with the remaining portion of said normally liquid hydrocarbon of Step (b) prior to returning into said catalytic hydroprocessing zone of Step (a); (i) passing a substantially hydrogen-free normally liquid hydrocarbon fraction from said stripping zone of Step (d) to a fractionation zone; and, (j) recovering the normally liquid hydrocarbons of Step (a).

Thus, it is apparent that the present invention provides a method for the recovery and reuse of hydrogen from a normally liquid hydrocarbon fraction produced by the catalytic hydroprocessing of a petroleum crude oil feedstock utilizing an interrelated and interdependent series of processing steps to accomplish the recovery and subsequent reuse of the hydrogen in a manner eliminating extraneous high pressure process hardware. Maximum utilization of the existing hydrogen in the process is therefore achieved.

I claim as my invention:

1. A method for the recovery and reuse of hydrogen from a normally liquid hydrocarbon fraction produced by the catalytic hydroprocessing of a petroleum crude oil feedstock which comprises the steps of:
    (a) introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons;
    (b) passing said effluent stream into a separation zone wherein said stream is separated into a hydrogen-rich gaseous hydrocarbon fraction, a normally gaseous component fraction, a normally gaseous hydrocarbon fraction and a normally liquid hydrocarbon fraction;
    (c) passing said gaseous fractions of Step (b) into a second separation zone wherein said fractions are separated into hydrogen, hydrocarbon, and gaseous component;
    (d) passing at least a portion of said normally liquid hydrocarbon fraction into a stripping zone maintained under stripping conditions wherein said fraction is contacted with high pressure superheated steam to preferentially strip hydrogen from said fraction;
    (e) passing said hydrogen of Step (d) to admix at an intermediate pressure with an added low pressure makeup hydrogen stream;
    (f) compressing the resultant combined hydrogen stream formed in Step (e) to substantially the same operating pressure imposed upon said catalytic hydroprocessing zone;
    (g) passing said compressed combined hydrogen stream of Step (f) and said hydrogen of Step (c) to said catalytic hydroprocessing zone of Step (a);
    (h) passing a substantially hydrogen-free normally liquid hydrocarbon fraction from said stripping zone of Step (d) into a fractionation zone; and,
    (i) recovering the normally liquid hydrocarbons of Step (a).

2. The method according to claim 1 wherein said petroleum crude oil feedstock is admixed with said compressed combined hydrogen stream of Step (f) prior to passing to said catalytic hydroprocessing zone.

3. The method according to claim 1 wherein said catalytic hydroprocessing conditions include a temperature above about 600° F. and a pressure above about 1000 p.s.i.g. and wherein said stripping conditions include a substantially lower pressure than that imposed upon said catalytic hydroprocessing zone.

4. The method according to claim 1 wherein a heavy liquid hydrocarbon fraction from said fractionation zone of Step (h) is recycled and admixed with said petroleum crude oil feedstock.

5. A method for the recovery and reuse of hydrogen from a normally liquid hydrocarbon fraction produced by the catalytic hydroprocessing of a petroleum crude oil feedstock which comprises the steps of:
    (a) introducing said feedstock into a catalytic hydroprocessing zone maintained under catalytic hydroprocessing conditions including the presence of hydrogen sufficient to produce an effluent stream containing unreacted hydrogen gas, normally gaseous components, normally gaseous hydrocarbons, and normally liquid hydrocarbons;
    (b) passing said effluent stream into a separation zone wherein said stream is separated into a hydrogen-rich gaseous hydrocarbon fraction, a normally gaseous component fraction, a normally gaseous hydrocarbon fraction, and a normally liquid hydrocarbon fraction;
    (c) passing said gaseous fractions of Step (b) into a second separation zone wherein said fractions are separated into hydrogen, hydrocarbon, and gaseous components;
    (d) passing a portion of said normally liquid hydrocarbon fraction into a stripping zone maintained under stripping conditions wherein said fraction is contacted with high pressure superheated steam to preferentially strip hydrogen from said fraction;
    (e) passing a low pressure makeup hydrogen stream into a first compression zone wherein said stream is compressed and then passed to a second compression zone wherein said stream is further compressed to an intermediate pressure;
    (f) passing said hydrogen of Step (d) to admix at said intermediate pressure with said hydrogen stream of Step (e);
    (g) compressing in a third compression zone the resultant combined hydrogen stream formed in Step (f) to substantially the same operating pressure imposed upon said catalytic hydroprocessing zone;
    (h) passing said compressed combined hydrogen stream of Step (g) and said hydrogen of Step (c) to admixture with the remaining portion of said normally liquid hydrocarbon of Step (b) and introducing the resultant mixture into said catalytic hydroprocessing zone of Step (a);
    (i) passing a substantially hydrogen-free normally liquid hydrocarbon fraction from said strpiping zone of Step (d) to a fractionation zone; and,
    (j) recovering the normally liquid hydrocarbons of Step (a).

6. The method according to claim 5 wherein said petroleum crude oil feedstock is admixed with said compressed combined hydrogen stream of Step (g) prior to passing to said catalytic hydroprocessing zone.

7. The method according to claim 5 wherein said catalytic hydroprocessing conditions include a temperature above about 600° F. and a pressure above about 1000 p.s.i.g. and wherein said stripping conditions include a substantially lower pressure than that imposed upon said catalytic hydroprocessing zone.

8. The method according to claim 5 wherein a heavy liquid hydrocarbon fraction from said fractionation zone of Step (i) is recycled and admixed with said petroleum crude oil feedstock.

9. The method according to claim 5 wherein said makeup hydrogen stream is at a pressure of from about atmospheric to about 200 p.s.i.g. and wherein said first compression zone is maintained so that said stream is compressed to about 500 p.s.i.g., and wherein said second compression zone is maintained so that discharge pressure from said zone is obtained at about 1300 p.s.i.g. and wherein said third compression zone is maintained so that discharge pressure from said zone is obtained at a pressure of at least 3000 p.s.i.g.

References Cited

UNITED STATES PATENTS

| | | | | |
|---|---|---|---|---|
| 3,401,111 | 9/1968 | Jackson | | 208—108 |
| 3,481,860 | 12/1969 | Borst | | 208—108 |

DELBERT E. GANTZ, Primary Examiner

R. BRUSKIN, Assistant Examiner